C. H. HERMAN.
ATTACHMENT FOR VEHICLES.
APPLICATION FILED MAR. 20, 1912.
1,037,908.
Patented Sept. 10, 1912.
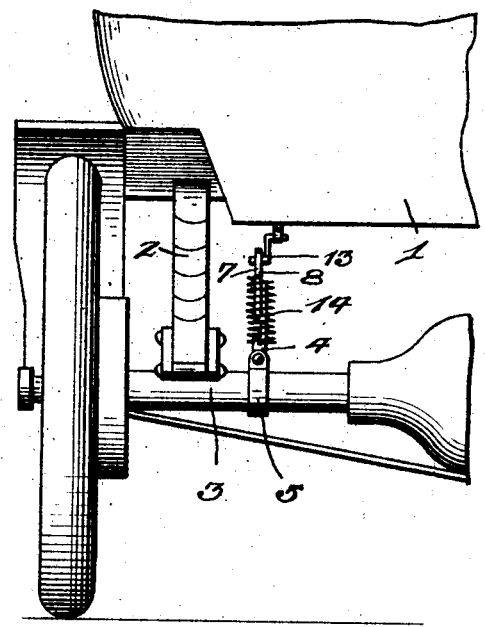
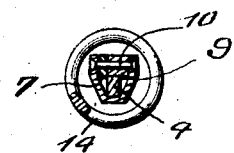
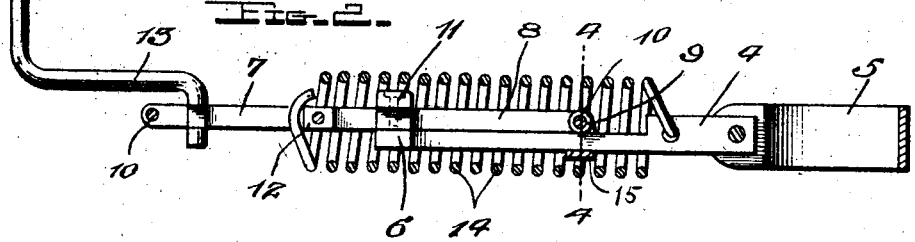
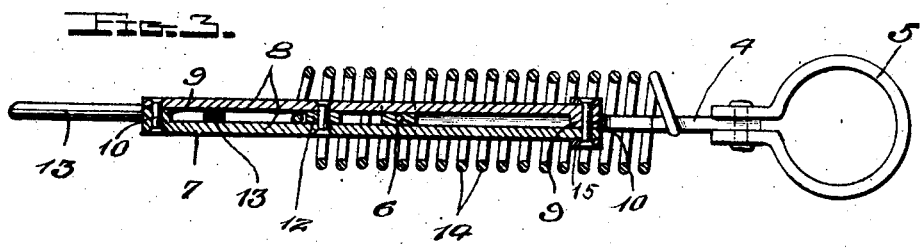
Witnesses
Chas. L. Griesbauer.
A. B. Norton.
Inventor
C. H. Herman,
By Watson E. Coleman
Attorney

UNITED STATES PATENT OFFICE.

CHARLES H. HERMAN, OF MEDFORD, OREGON.

ATTACHMENT FOR VEHICLES.

1,037,908.  Specification of Letters Patent.  Patented Sept. 10, 1912.

Application filed March 20, 1912. Serial No. 685,043.

*To all whom it may concern:*

Be it known that I, CHARLES H. HERMAN, a citizen of the United States, residing at Medford, in the county of Jackson and State of Oregon, have invented certain new and useful Improvements in Attachments for Vehicles, of which the following is a specification, reference being had to the accompanying drawings.

My invention relates to new and useful improvements in means for limiting the action of vehicle springs and more particularly to a device for application to automobiles and my object is to provide a device adapted to have connection with the axle and frame of a vehicle which will limit the upward movement of the frame when the same is under action of the springs of the vehicle.

A further object of the invention resides in providing an expansible member held in its normal contracted position by means of a coil spring and a still further object resides in providing means in connection with the expansible member which is adapted to have connection with the frame of the vehicle and which is movable independently of the expansible member.

Still another object of the invention resides in providing a device which is extremely simple and durable in construction, inexpensive to manufacture, and one which will be very efficient and useful in operation.

With these and other objects in view the invention consists in the novel features of construction, combination and arrangement of parts as will be hereinafter referred to and more particularly pointed out in the specification and claims.

In the accompanying drawing forming a part of this application, Figure 1 is a fragmentary rear elevation of a motor vehicle showing my improved device applied to use thereon. Fig. 2 is a vertical section through the device, with parts in elevation. Fig. 3 is a similar view taken at right angles to that shown in Fig. 2; and Fig. 4 is a horizontal section through the device.

In describing my invention, I shall refer to the drawing in which similar reference characters designate corresponding parts throughout the several views and in which—

1 indicates a frame of a vehicle such as an automobile supported on the springs 2 which are in turn secured to the axle 3 and in order to limit the upward movement of said frame under tension of the springs, after the latter have been compressed during the movement of the vehicle, I provide my improved device. This device comprises an arm 4, the lower end of which is clamped to the axle 3 so as to extend vertically upward therefrom by means of a clamping member 5 and the upper end thereof has a head 6 formed thereon which is disposed in sliding engagement with an upper member 7. This upper member comprises a pair of parallel arms 8 which are held in spaced relation with respect to one another by means of the integral spacing lugs 9 formed at the ends of said arms and held together by means of the bolts 10 extending through said arms at the ends thereof. As stated, the head member 6, of the arm 4, is disposed in sliding engagement between the arms of this member 7, the same being held in engagement therewith by means of a cap member 11 engaged with said head, and from this construction it will be seen that the expansible movement of the member 7 with respect to the arm 4 will be limited by the engagement of the head 6, with the lower spacing lug 9. An additional lug or the like 12 is secured between the arms 8 adjacent the upper end of said member 7 to limit the contracted movement of the members 4 and 7 with respect to one another and disposed in sliding engagement with the member 7 between the lug 12 and the upper spacing lug 9 is the lower end of a hook member or the like 13, said hook member being engaged with the frame 1 of the vehicle. Encircling the members 4 and 7, is a coil spring 14, one end of which is engaged with an opening in the lower end of the arm 4, while the upper end of the same is engaged over the additional lug 12 between the arms 8 and this spring, it will be seen, will retain the device normally in its contracted position. In order to guide the member 7 in its movement, a guide collar 15 is provided on the lower end of said member 7, which encircles the arm 4 and is secured on the lower pin 10, which retains the arms 8 together.

In practice, the device is so formed that when applied to the vehicle, the same will be substantially in its contracted position and when the frame of the vehicle is caused to be lowered against the tension of the springs under load, the member 13 which is engaged with the frame, and disposed in sliding engagement with the arm 8, will also be lowered. The frame on its return movement, under tension of the vehicle springs, will have a tendency to extend far above its normal position which will be compensated for by the expansion of my device, but the upward movement of the frame will be limited by the contact of the lower spacing lug on the member 7 with the head member on the lower arm 4. Thus the frame can not rise under the tension of the springs to any great extent and the possibility of the vehicle springs being broken from this cause will be eliminated.

It is a well known fact among automobilists that springs are constantly broken through the upward movement of the frame of the vehicle under tension of said springs and various devices have been supplied for the purpose of preventing such damage, but my device will positively carry out the purpose for which it is designed and will obviate the many difficulties heretofore experienced along this line.

From the foregoing it will be seen that I have provided a simple, inexpensive and efficient device for carrying out the objects of the invention and while I have particularly described the elements most well adapted to perform the functions set forth, it is obvious that various changes in form, proportion and in the minor details of construction may be resorted to without departing from the spirit or sacrificing any of the principles of the invention.

Having thus described this invention, what is claimed is:—

1. In a device of the class described, the combination with a vehicle frame, springs therefor and an axle to which said springs are secured; of a member formed of a pair of sections, one of said sections having engagement with said axle, means arranged in sliding engagement with the opposite section and having secure engagement with said frame, means to limit the sliding movement of the one section with respect to the other, and additional means to normally retain the one member in contracted position with respect to the other.

2. In a device of the class described, the combination with a vehicle frame, springs therefor, and an axle to which said springs are secured; of a pair of members arranged in sliding engagement with one another, means to securely mount one of said members on the axle, additional means having sliding engagement with the other member and securely engaged with said frame, means to limit the sliding movement of said last mentioned member with respect to the former, and a spring encircling said members and having the ends thereof respectively engaged with the same.

3. In a device of the class described, the combination with a vehicle frame, springs therefor, and an axle to which said springs are secured; of a pair of members slidably engaged with one another, means to mount one of said members on the axle, a connecting member having one end thereof secured to the frame and the other disposed in sliding engagement with the other of said pair of members, means to limit the sliding movement of said connecting member on the last mentioned member, additional means to limit the sliding movement of said first mentioned member with respect to one another, and a coil spring encircling said members and having the ends thereof respectively engaged with the same.

In testimony whereof I hereunto affix my signature in the presence of two witnesses.

CHARLES H. HERMAN.

Witnesses:
 GLENN O. TAYLOR,
 CORA T. HOTALING.